Figure 1:
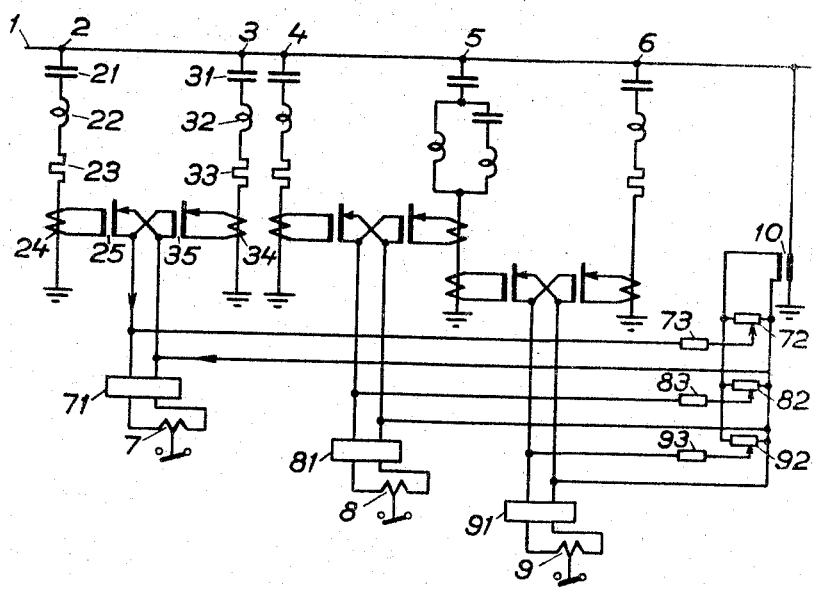

May 9, 1967    N. FAHLÉN    3,319,120

PROTECTION MEANS FOR SINGLE-PHASE CAPACITOR BANK

Filed May 5, 1964

INVENTOR.
NILS FAHLÉN
BY Bailey, Stephen &
Huettig

United States Patent Office 3,319,120
Patented May 9, 1967

3,319,120
PROTECTION MEANS FOR SINGLE-PHASE CAPACITOR BANK
Nils Fahlén, Vasteras, Sweden, assignor to Allmanna Svenska Elektriska Aktiebolaget, Vasteras, Sweden, a corporation of Sweden
Filed May 5, 1964, Ser. No. 364,957
Claims priority, application Sweden, June 6, 1963, 6,239/63
6 Claims. (Cl. 317—12)

The present invention relates to a protection means for a single phase capacitor bank, for example such as may occur when a capacitor bank connected to a multi-phase network is split into several single phase parts and the invention is intended for such capacitor banks which are composed of at least two parallel branches. A protection means according to the invention is particularly suitable when the impedances of the different branches in the capacitor bank are dissimilar. Such capacitor banks having dissimilar impedances in the different branches occur, for example, in over-harmonic filters such as those used with current converters where the different branches in the filter are tuned to damp the different harmonics in the network. A similar case with dissimilar branches in a capacitor bank occurs when a capacitor bank has been built up in several stages so that capacitor elements having different values occur, for example due to different dielectrics having been used. Furthermore, it may be stated that in practice it is impossible for two capacitor systems to be exactly similar since the manufacture of capacitors always causes certain discrepancies of such a size that they influence the function of a protection means.

A protection means according to the invention is characterized by a measuring transformer having an adjustable secondary circuit in each branch of the capacitor bank, which measuring transformers are counter-connected in pairs and connected to an indicating means to which a compensating means is also connected to compensate the difference between the signals coming from the two measuring transformers. The secondary circuits of the two measuring transformers should be adjusted so that the difference between their signals is in phase with the voltage across the capacitor bank. In this way the advantage is gained that the compensation magnitude may be taken out as a function of the voltage across the capacitor bank, for example with the aid of a voltage transformer having adjustable secondary circuit. It is therefore possible, in an extremely simple manner, according to the invention, with a faultless capacitor bank to adjust the indicating means to zero and no phase shifting means is required in the compensating means. Further, with a multi-phase network it is an advantage to split the capacitor protection into single-phase protection means so that the protection type will be completely insensitive to phase dissymmetries in the network.

With capacitor banks concerned with over harmonic filters it is advisable, and in other cases it may be desirable, to insert a filter of the band-pass filter type tuned to the fundamental frequency of the network between each pair of measuring transformers and the corresponding indicating means, so that the indicating means is only influenced by currents having the fundamental frequency.

Figure 2:
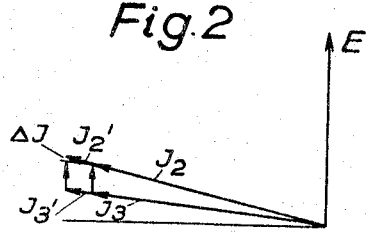

The invention will be further described with reference to the accompanying drawing where FIGURE 1 shows a protection means according to the invention intended for an over harmonic filter comprising a number of parallel filter circuits, while FIGURE 2 shows in a vector diagram how a pair of measuring transformers are tuned in relation to each other.

FIGURE 1 shows a conductor 1, for example a phase conductor in a multi-phase network, to which conductor an over-harmonic filter is connected comprising a number of parallel filter circuits 2–6. The circuits 2, 3, 4 and 6 could, for example, be tuned for the harmonics 5, 7, 11 and 13 respectively, while the filter circuit 5 is composed as a high frequency filter. Looking at one pair of filter circuits 2 and 3 it is seen that these comprise capacitors 21 and 31, inductances 22 and 32 and resistors 23 and 33. Current transformers 24 and 34 are inserted in the filter circuits, which current transformers are counter-connected to each other by adjustable intermediate transformers 25 and 35. The current difference from the two intermediate transformers 25 and 35 is connected to an indicating means in the form of a relay protection device 7 and between this and the intermediate transformers a band-phase filter 71 is inserted which allows only currents of fundamental frequency to pass.

Since the impedances of the two filter circuits 2 and 3 are dissimilar it is impossible for the current difference from the two intermediate transformers 25 and 35 to become zero. Instead, the intermediate transformers are adjusted in such a manner that the current difference from them will be in phase with the capacitor voltage as shown in FIGURE 2 which, in vector diagram, shows the currents $I_2$ and $I_3$ from the intermediate transformers 25 and 35 respectively, and also the capacitor voltage E.

In this way it is possible as a compensation magnitude for the zero adjustment of the indicating means to use quite simply a current which is in phase with the capacitor voltage, which current is suitably derived with the aid of a voltage transformer 10 as shown in FIGURE 1. The secondary side of this voltage transformer is connected to a number of voltage dividers 72, 82 and 92 through resistors 73, 83, and 93 from which compensating currents are taken out to the indicating means for the different pairs of filter circuits. Thus, according to the invention it is unnecessary to have a phase-shifting device in conjunction with the compensating means, as is the case with most known protection means for capacitor banks.

Even if the different branches of a capacitor bank are composed of exactly similar elements and the impedances are in principle therefore equal, certain discrepancies must in practice be reckoned with so that even in such a case it is not possible to get the currents $I_2$ and $I_3$ to coincide. Therefore, even with a protection device for such a bank a compensating magnitude will be necessary and the present invention therefore provides great advantages even with such banks.

In FIGURE 2 currents $I_2'$ and $I_3'$ have been indicated which correspond to the currents at an increased network frequency. These currents will be greater than the original currents and the difference between them exceeds the original difference by a certain amount $\Delta I$. By pairing off the filter circuits whose impedances are most similar, however, this increase in the current difference will be negligible. In FIGURE 1 the filter circuits corresponding to the two lowest harmonics have been paired off, while filter 5 has been paired partly with circuit 4 and partly with circuit 6 corresponding to the 11th and 13th harmonic respectively.

The corresponding two pairs of measuring transformers are connected to indicating means 8 and 9 through band pass filters 81 and 91, respectively, of the same kind as the filter 71 for the first pair.

Further, it is clear from FIGURE 1 that with an odd number of branches in a capacitor bank or a filter one of the branches may suitably be paired with two of the other branches. If a fault occurs in branch 5, therefore, both the indicating means 8 and 9 will react which, however, cannot be considered any great disadvantage.

On the contrary inter-connecting of three branches has the advantage of selective indicating. If both the indicating means 8 and 9 react, this means that there is probably a fault in the filter branch 5, while an indication from one of the means 8 or 9 indicates a fault in the corresponding circuit 4 or 6 respectively. On the other hand upon an indication from the means 7 it is necessary to investigate both the circuits 2 and 3.

I claim:

1. Relay protection means for a one phase capacitor bank comprising at least two parallel branches connected to a phase of an A.C. network; comprising a measuring transformer in each branch having adjusting means on its secondary side; means counter-connecting said secondary sides; relay means connected to said counter-connection of said sides; compensating means connected to said A.C. phase for deriving a compensating magnitude for compensating the output signal from said counter-connection, and means to feed said compensating magnitude to said relay means.

2. Relay protection means as claimed in claim 1; said compensating means comprising a voltage transformer with adjusting means on its secondary side; the primary side of said voltage transformer being connected to said A.C. phase.

3. Relay protection means as claimed in claim 1; an adjustable intermediate transformer connected between each measuring transformer and the relay means.

4. Relay protection means as claimed in claim 1; a band-pass filter connected between said measuring transformers and the relay means; said band-pass filter being tuned to the fundamental frequency of said network.

5. Relay protection means for a one phase capacitor bank having a plurality of parallel branches connected to a phase of an A.C. network; comprising a measuring transformer in each branch having adjusting means on its secondary side; means counter-connecting the secondary side of each measuring transformer with the secondary side of at least one other measuring transformer; relay means connected to each said counter-connection; compensating means connected to said A.C. phase for deriving a compensating magnitude equal to and opposite in phase to the output signal from said counter-connection, and means to feed said compensating magnitude to said relay means.

6. Relay protection means as claimed in claim 1; each pair of counter-connected secondary sides being adjusted in relation to each other so that the output signal from said counter-connection is equal in phase to the corresponding phase of said A.C. network; said compensating means comprising a voltage transformer with adjusting means on its secondary side; the primary side of said voltage transformer being connected to said corresponding phase of said A.C. network.

References Cited by the Examiner

UNITED STATES PATENTS

| | | | |
|---|---|---|---|
| 1,732,977 | 10/1929 | Mayr | 317—32 X |
| 2,545,894 | 3/1951 | Parker | 317—138 X |
| 3,143,687 | 8/1964 | Hjertberg | 317—12 |

MILTON O. HIRSHFIELD, *Primary Examiner.*

R. V. LUPO, *Assistant Examiner.*